United States Patent [19]

Chevalier

[11] 4,063,390
[45] Dec. 20, 1977

[54] METHOD AND A DEVICE FOR MACHINING PARTS AND ESPECIALLY OPTICAL LENSES BY MEANS OF A MODEL

[76] Inventor: Alain Chevalier, 37, Rue Corot, Saint Michel sur Orge, France

[21] Appl. No.: 692,520

[22] Filed: June 3, 1976

[30] Foreign Application Priority Data

June 6, 1975 France .................... 75.17671

[51] Int. Cl.² .................. B24B 13/00; B24B 1/00
[52] U.S. Cl. .................. 51/101 LG; 51/284 R
[58] Field of Search .......... 51/101 R, 101 LG, 284, 51/50 PC, 100 R, 327, 165.72; 90/13.4, 62 R

[56] References Cited
U.S. PATENT DOCUMENTS

| | | | |
|---|---|---|---|
| 1,286,032 | 11/1918 | Laisne | 51/50 PC |
| 1,326,462 | 12/1919 | Murch | 51/101 R |
| 3,041,789 | 7/1962 | Cretin-Maitenaz | 51/101 R |
| 3,789,551 | 2/1974 | Norris | 51/100 R |
| 3,864,878 | 2/1975 | Ledebur | 51/101 R |

Primary Examiner—James L. Jones, Jr.
Assistant Examiner—Nicholas P. Godici
Attorney, Agent, or Firm—Toren, McGeady and Stanger

[57] ABSTRACT

In machining parts and especially optical lenses by means of a model, a single model having a shape which is the reverse of that of the part to be obtained is used for all of the various machining operations. In the machining operations, on the one hand, the model is coupled with the tool which machines the part and, on the other hand, the part to be machined is coupled with a feeler which is in contact with the model.

11 Claims, 4 Drawing Figures

METHOD AND A DEVICE FOR MACHINING PARTS AND ESPECIALLY OPTICAL LENSES BY MEANS OF A MODEL

This invention relates to the matching of parts and especially optical lenses by means of a model or template.

For machining optical lenses, three operations are usually necessary: rough-forming, fine-grinding and polishing.

In the technique employed at the present time, the rough-forming operation is carried out by identical copying from a model in order to obtain a part which conforms to the model; on the other hand, a different model is employed in the last two finishing operations and this model has a shape which is the reverse of that of the part to be treated.

From this it follows in the first place that two models have to be provided for the same part to be obtained, namely a convex model and a concave model, thus increasing the cost price. In the second place, one of the models has to be demounted during the machining operation, thereby entailing the need for costly handling operations which are potential causes of error and of impairment of accuracy.

The aim of this invention is to remove these disadvantages.

To this end, the method in accordance with the invention is characterized by the use of a single model having a shape or surface which is the reverse of the surface on the part to be obtained in the various machining operations and by the coupling, on the one hand, of the model with the tool which machines the part and, on the other hand, of the part to be machined with a feeler which is in contact with the model.

The device in accordance with the invention which comprises in known manner a model support, a feeler support in contact with the model, a support for the part to be machined and a support for the tool employed for machining the part, is characterized in that, two assemblies are constituted, respectively, and by the model support and the tool support and the other by the feeler support and the support for the part to be machined, the supports of each pair or assembly are rigidly coupled together, the shape of the surface of the model contacted by the feeler is the reverse of the shape of the surface of the part to be machined.

A clear understanding of the invention will be obtained from a perusal of the following description, reference being made to the accompanying drawings, wherein.

Figure 1:
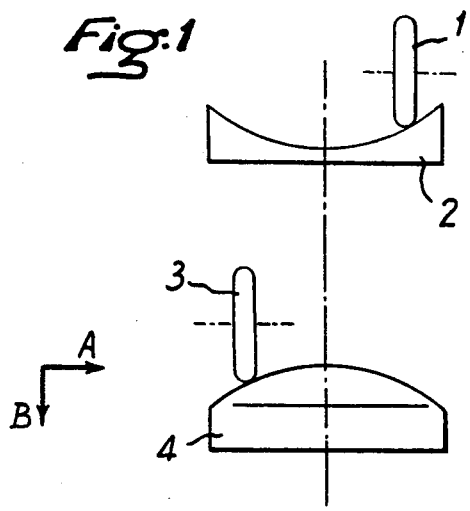
FIG. 1 is a diagrammatic illustration of the method in accordance with the invention.

As shown in FIG. 1, the invention is based on the fact that, in order to obtain a part 2 of given shape that is, to shape one of its surfaces which is concave in the example under consideration, a model 4 is used having a surface, the shape of which is the reverse of that of the surface of the part, that is to say convex in the example considered, and on the fact that a rigid coupling is established on the one hand between the model 4, or more precisely the support for the model, and the tool 1, or more precisely the tool support, and on the other hand between the feeler 3, or more precisely the feeler support, and the part 2, or more precisely the support for this latter. In the example of the construction which will be described below, the supports for the model 4 and the tool 1 are stationary while the supports for the feeler 3 and the part 2 are displaced in rigidly fixed relation in a composite motion, note FIG. 1, consisting of feed motion A and application motion B disposed in perpendicular directions to one another in order to ensure that the feeler 3 explores the entire surface of the model 4 and that the entire surface of the part 2 passes beneath the tool 1.

Figure 2:
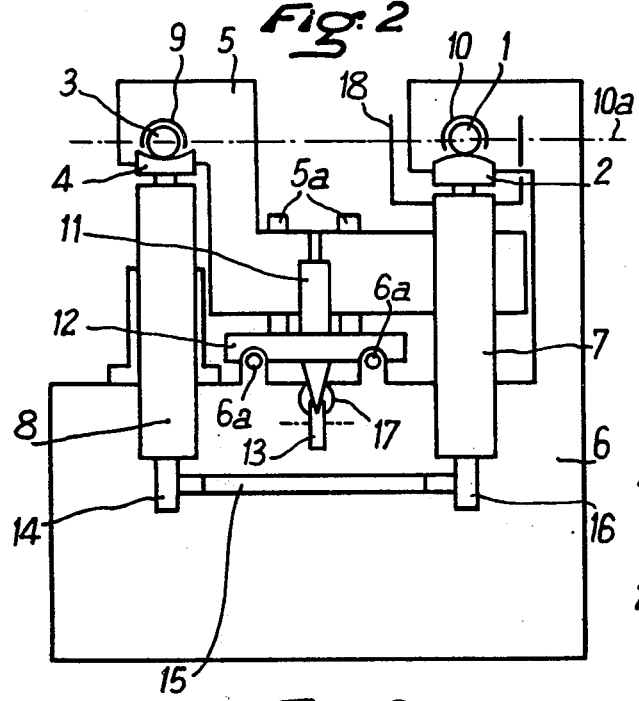
FIG. 2 is a diagrammatic view in elevation showing the device in accordance with the invention.

A preferred embodiment of the device, in accordance with the invention, is shown in FIG. 2. This device comprises a base 6 of cast-iron, for example, on which is mounted a table 12. The table is capable of horizontal displacement in a direction at right angles to the plane of FIG. 2 by sliding on guides 6a. This movement is produced by means of a cam 13 having a progressive downward slope by means of a motor (not shown) which cooperates with a horizontal jack 17.

There is rigidly mounted on the base 6 a spindle 8 for supporting the model 4 and a spindle 10 for supporting the tool 1 which is intended to machine the part 2. The axis of the spindle 8 is vertical and the axis of the spindle 10 is orthogonal to the axis of the spindle 8 and parallel to the direction of horizontal displacement of the table 12. If necessary, the axis of the tool-carrying spindle 10 can be perpendicular to the direction of displacement while remaining horizontal as shown at 10a.

The base 6 also carries a body 5 which is capable of moving in a vertical direction at right angles to the direction of the table 12 by means of a pneumatic, hydraulic or electric jack 11 which subjects the feeler 3 to the desired force of application on the model 4. The body 5 is guided vertically by means of guides 5a of the table 12. A spindle 9 for supporting the feeler 3 and a spindle 7 for supporting the part 2 are rigidly mounted on the body 5. The axis of the spindle 9 is either parallel or perpendicular to the axis of the spindle 10 and the axis of the spindle 7 is parallel to the axis of the spindle 8.

During operation, the body 5 displaces in rigidly fixed relation the feeler-carrying spindle 9 and the part-carrying spindle 7 in a composite movement of feed motion A and of application motion B produced by the cam 13 and the jack 11. The model-carrying spindle 8 and the part-carrying spindle 7, the axes of which always remain parallel, are driven in synchronism in the same direction by means of a sliding device 15 of the cardan type which is in turn driven by a motor (not shown) and by two reduction-gear units 14, 16. The feeler 3 is freely rotatable on its spindle 9 and the tool-carrying spindle 10 is driven in rotation by a motor (not shown). In its active zone, the feeler 3 has the same shape as the tool 1.

By means of this arrangement, the tool 1 reproduces on the part 2 the same shape of surface as that of the model 4 but with opposite concavity, that is, relative to a horizontal plane through the model and the part, the surface of the model is concave and the surface of the part is convex, as shown in FIG. 2. During operation, the point of contact of the feeler 3 with the model 4 and the point of contact of the tool 1 with the part 2 are diametrically opposite with respect to the respective axes of rotation of the spindles 8 and 7.

Figure 4:
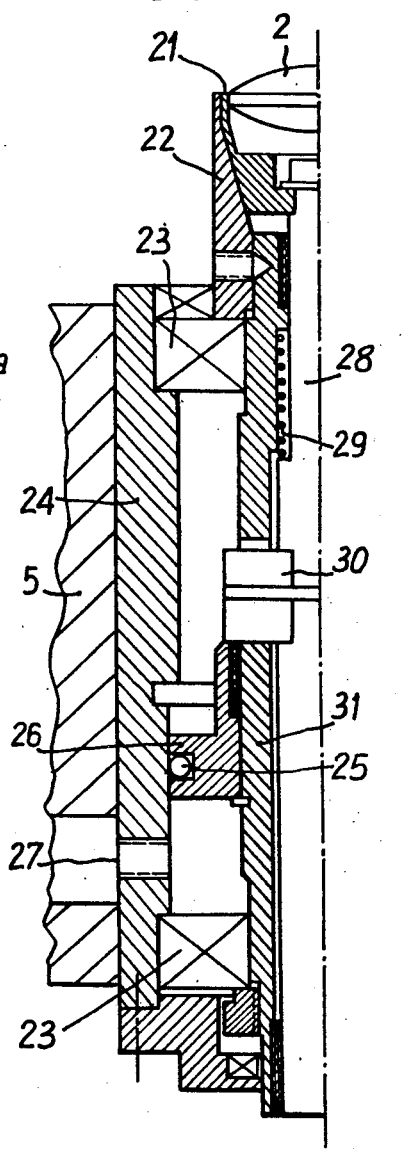
FIG. 4 is a vertical half-sectional view showing the means for mounting the part to be machined.

The means for mounting the part 2 are shown in FIG. 4. The model is mounted in an identical manner. These means comprise a centering ring 22 and a locking member 21 which receives the part 2 directly.

The centering ring 22 is rigidly fixed to a hollow shaft 31 mounted on two bearings 23. The bearings are carried by a body 24 which is rigidly fixed to the carrying unit 5. The part 2 is driven in rotation by means of the hollow shaft 31 and a lug 30. Locking of the part is carried out by means of the locking ring 21 which is rigidly fixed to a shaft 28, the shaft being actuated by a spring 29. The part is released by means of a fluid which is admitted through the port 27 and produces action on a piston 26 which releases the part 2 from the locking ring by bearing on the lug 30 in the axial direction. A ring 25 ensures leak-tightness between the piston 26 and the body 24.

Figure 3:
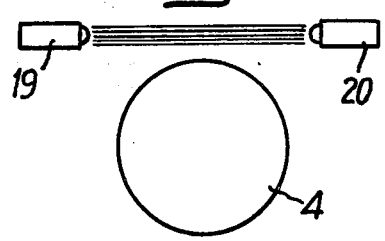
FIG. 3 is a plan view showing a detail of the device of FIG. 2.

A tank 18 which is intended to contain the coolant sprinkling liquid is placed around the part-carrying spindle 7. Control of application of the feeler 3 against the model 4 is carried out by means of a system of the photoelectric cell type as designated by the references 19 and 20 in FIG. 3; since the cell is rigidly fixed to the carrying body 5, application of the feeler is possible only when the beam emitted by the two cells is interrupted by the model 4.

It is readily apparent that the invention is not limited to the embodiment described in the foregoing but that, on the contrary, it would be possible to devise a number of different alternative forms without thereby departing either from the scope or the spirit of the invention.

What I claim is:

1. Method of machining workpieces, such as optical lenses, comprising performing a plurality of machining operations on a surface of the workpieces, using a single model for each of the machining operations and tracing a surface of the model for forming a corresponding and reversely shaped surface on the workpieces, mounting the model on a first support, mounting the workpiece on a second support, mounting a feeler for tracing the surface of the model on a third support, mounting a member for machining the workpiece on a fourth support, coupling the first support with the fourth support and coupling the second support with the third support separately from the coupling of the first and fourth supports, and rotating the model and the workpiece being machined at synchronous speeds.

2. Method, as set forth in claim 1, including the steps of fixing the coupled first support and fourth support in a stationary position and fixing the coupled second support and third support in rigidly fixed relation and movably displacing the coupled second and third supports relative to the stationarily positioned coupled first and fourth supports.

3. Device for machining workpieces, such as optical lenses, comprising a stationary base, a table displaceably mounted on said base for moement relative to said base, a body mounted on said table for movement in a plane perpendicular to the plane of movement of said table, a first support for a model having a surface of revolution to be used in shaping a surface of a workpiece, a second support for the workpiece to be machined, a feeler for placement in contact with the surface of the model to be traced, a third support for said feeler, a tool for machining the surface of said workpiece, a fourth support for said tool, a first spindle for rotating said first support for the model, a second spindle for rotating said second support for the workpiece to be machined, said first and fourth supports fixed to one of said base and said body, said second and third supports fixed to the other one of said base and said body, means for moving said table, means for moving said body, and means for rotating said first and second spindles in synchronism.

4. Device, as set forth in claim 3, wherein said first and fourth supports being fixed to said base and said second and third supports fixed to said body for moving said second and third supports relative to said first and fourth supports.

5. Device, as set forth in claim 4, wherein the points of contact of said tool with the workpiece is located relative to the axis of rotation of said second spindle 180° with respect to the point of contact of said feeler with the surface of the model being traced with respect to the axis of rotation of said first spindle.

6. Device, as set forth in claim 3, wherein said first and second spindles being parallel, a third spindle for movably displacing said feeler and a fourth spindle for movably displacing said tool, said third and fourth spindles being parallel and being perpendicular to said first and second spindles.

7. Device, as set forth in claim 3, wherein said first and second spindles being parallel, a third spindle for movably displacing said feeler, a fourth spindle for movably displacing said tool, said third and fourth spindles being disposed perpendicular to one another and being disposed perpendicular to said first and second spindles.

8. Device, as set forth in claim 6, wherein said second and third supports being mounted on said body and being capable of moving in two directions with one direction being parallel to the axes of said first and second spindles and the other direction being perpendicular to the plane of the axes of said spindles.

9. Device, as set forth in claim 7, wherein said second and third supports being mounted on said body and being capable of movment in two directions with one direction being parallel to the axes of said first and second spindles and the other direction being perpendicular to the plane of the axes of the spindles.

10. Device, as set forth in claim 3, wherein said table being movable in a plane perpendicular to the plane of the axes of said first and second spindles, and said body being supported on said table for movement in a direction parallel with the plane of the axes of said first and second spindles.

11. Device, as set forth in claim 3, wherein said feeler and said tool having substantially the same shape in the region thereof contacting the surface of the model and the surface of the workpiece, respectively, and said feeler being mounted for free motion and said tool being driven in rotation.

* * * * *